(12) United States Patent
Hashimoto

(10) Patent No.: US 8,085,627 B2
(45) Date of Patent: Dec. 27, 2011

(54) LENS POSITION CONTROL METHOD, LENS POSITION CONTROL APPARATUS, CUTTING METHOD, AND CUTTING APPARATUS

(75) Inventor: Gakuji Hashimoto, Chiba (JP)

(73) Assignee: Sony Corporation, Tokyo (JP)

(*) Notice: Subject to any disclaimer, the term of this patent is extended or adjusted under 35 U.S.C. 154(b) by 1260 days.

(21) Appl. No.: 11/458,172

(22) Filed: Jul. 18, 2006

(65) Prior Publication Data

US 2007/0025208 A1    Feb. 1, 2007

(30) Foreign Application Priority Data

Jul. 26, 2005  (JP) ................ P2005-215311

(51) Int. Cl.
*G11B 7/00* (2006.01)
(52) U.S. Cl. .............. 369/44.26; 369/53.23
(58) Field of Classification Search .......... 369/47.1, 369/44.27, 44.28, 112.01, 275.1, 94, 44.26, 369/44.35, 44.25, 126, 53.22, 53.23, 47.27, 369/47.28; 386/126
See application file for complete search history.

(56) References Cited

U.S. PATENT DOCUMENTS 6,564,009 B2 *  5/2003  Owa et al. ............ 386/126
6,721,244 B2 *  4/2004  Kubota ............ 369/44.27

* cited by examiner

*Primary Examiner* — Nabil Hindi
(74) *Attorney, Agent, or Firm* — SNR Denton US LLP

(57) ABSTRACT

A lens position control method is disclosed. Either an objective lens or a master disc having a resist material film on its substrate is moved, thereby changing a distance between the objective lens and the master disc surface. A return laser beam transmitted through the objective lens and reflected by the master disc surface is detected by a photodetector. The movement of either of them is stopped when the master disc is located near a focal point of the objective lens and the return laser beam is detected. Limit data is rewritten to data corresponding to a position obtained by adding a movement permission amount smaller than a working distance of the objective lens to the stop position. When the return laser beam is not detected, the movement which changes the distance between them is stopped at a position corresponding to the limit data.

12 Claims, 9 Drawing Sheets

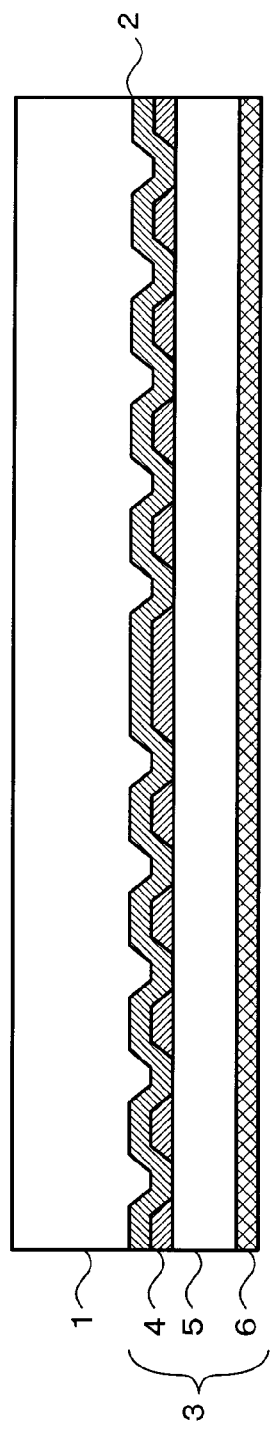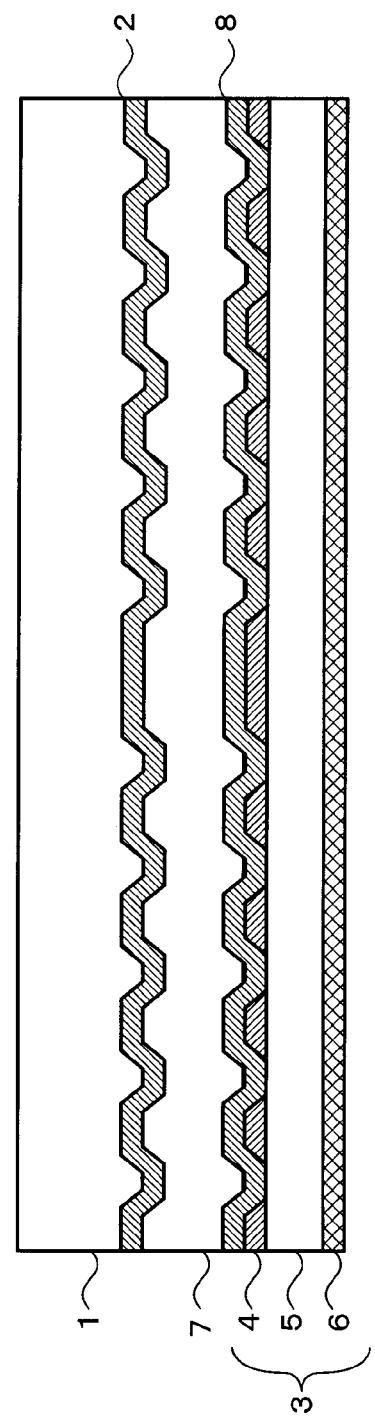

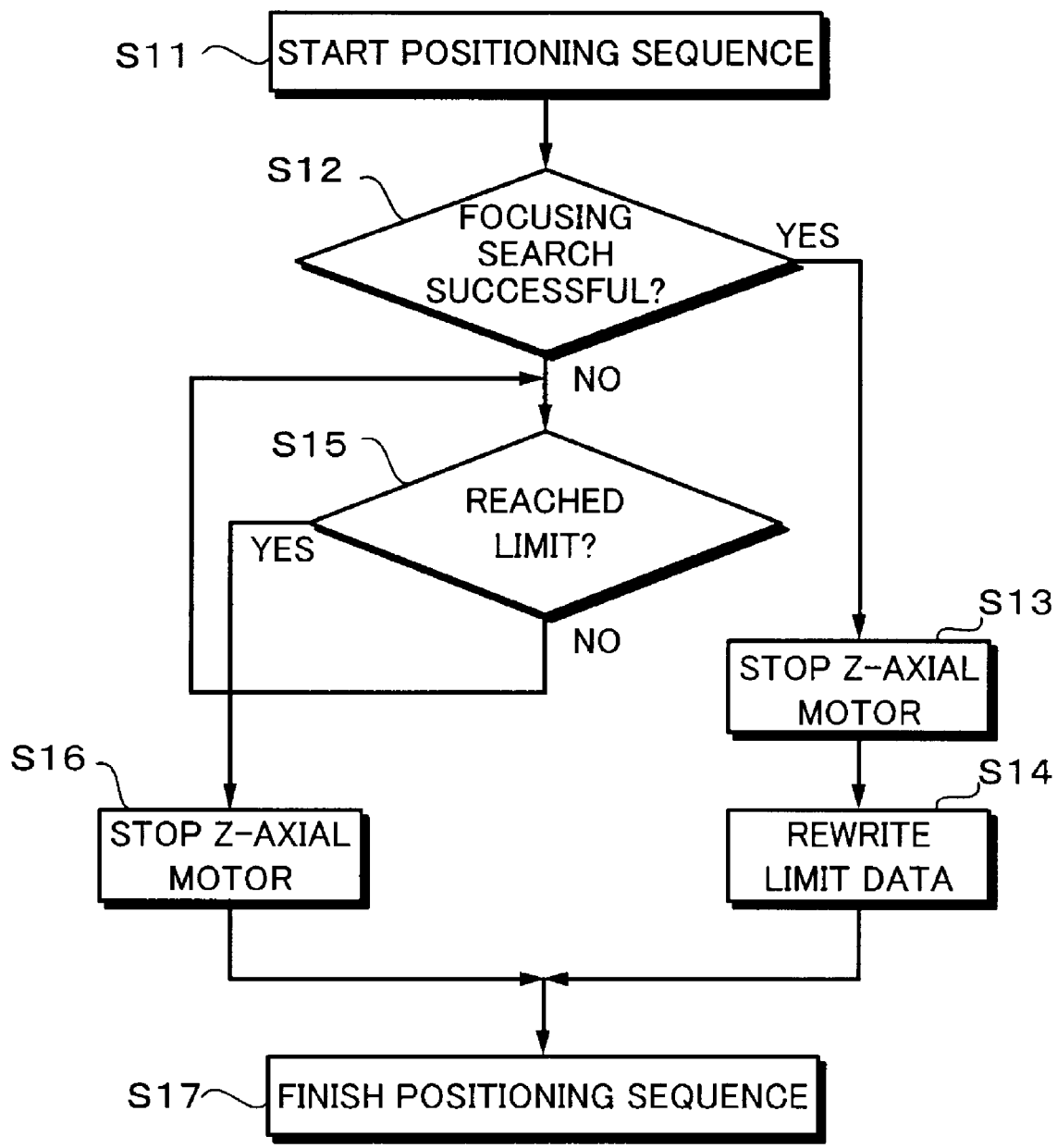

LENS POSITION CONTROL METHOD, LENS POSITION CONTROL APPARATUS, CUTTING METHOD, AND CUTTING APPARATUS

CROSS REFERENCES TO RELATED APPLICATIONS

The present invention contains subject matter related to Japanese Patent Application JP 2005-215311 filed in the Japanese Patent Office on Jul. 26, 2005, the entire contents of which being incorporated herein by reference.

BACKGROUND OF THE INVENTION

1. Field of the Invention

The invention relates to a lens position control method, a lens position control apparatus, a cutting method, and a cutting apparatus which are applied to position control of an objective lens in a cutting step upon manufacturing of, for example, a high-density optical disc.

2. Description of the Related Arts

As a high-density optical disc, for example, there has been proposed an optical disc having a recording capacity of about 25 Gbytes for a single layer of one side or having a recording capacity of about 50 Gbytes for double layers of one side. In such an optical disc, in order to decrease a spot diameter of a beam for recording and reproduction, a wavelength of a light source is set to 405 nm and a numerical aperture NA of an objective lens is set to a large value of 0.85. In the high-density optical disc, a beam spot area can be reduced to about ⅕ of that of a DVD. Further, since an angular error (called a tilt margin) which is permitted for an inclination from 90° of an angle formed between the disc surface and an optical axis of a laser beam decreases as a result of an increase in the numerical aperture NA of the objective lens, a cover layer covering an information layer is thinned to 0.1 mm. In the case of a read only disc, the information layer is a reflecting layer or a translucent reflecting layer on which pits have been formed. In the case of a recordable disc, the information layer is a recordable layer such as a phase change layer or the like on which grooves have been formed.

FIGS. 1A and 1B show structures of examples of a high-density optical disc to which an embodiment of the invention can be applied. FIG. 1A shows the structure of a single layer. Reference numeral 1 denotes a substrate made of polycarbonate (hereinafter, properly abbreviated to PC) having a thickness of 1.1 mm.

Pits of a master disc have been transferred onto the surface of the substrate 1 by injection molding. The substrate 1 is coated with a reflecting film 2. A cover layer 3 as a light transmitting layer having a thickness of 0.1 mm has been adhered onto the reflecting film 2. The cover layer 3 is formed by a method whereby a PC sheet 5 which has previously been punched is adhered with a UV (ultraviolet rays) hardening type adhesive agent 4 and a surface portion of the PC sheet 5 is coated with a hard coating 6.

FIG. 1B shows the structure of double layers. In a manner similar to the single-layer structure, FIG. 1B shows the disc having two information layers each having such a structure that the reflecting film 2 as a total reflecting film is formed on a substrate of 1.1 mm, a translucent reflecting film 8 is formed on a light transmitting layer 7 called an intermediate layer formed on the reflecting film 2, and further the cover layer 3 is adhered onto the translucent reflecting film 8. The reflecting film 2 is formed in a depth of 100 μm when seen from the incident direction (on the side of the hard coating 6) of the laser beam and the translucent reflecting film 8 is formed in a depth of 75 μm.

In the case of the one-side double-layer disc shown in FIG. 1B, the reflecting film 2 existing in the depth of 100 μm when seen from the incident direction of the laser beam is defined as a reference layer (the 0th recording layer; called an L0 layer) and the recording layer added in the depth of 75 μm is defined as a first recording layer (called an L1 layer).

An outline of a manufacturing method of the high-density optical disc will be described with reference to FIG. 2. Reference numeral S1 denotes a molding step by a stamper for L0. In a mastering step, a resist on the substrate is exposed by the laser beam, a disc-shaped master disc having concave/convex portions corresponding to pits or grooves on the resist is formed by development, and a stamper for the L0 layer made of a metal is formed from the disc-shaped master disc. In the molding step S1, the substrate 1 is formed by injection molding by using the formed stamper and a molding material such as PC. The molded substrate 1 is cooled by a cooling apparatus.

Subsequently, a film forming step S2 of the reflecting film 2 as a total reflecting film of the L0 layer is executed. In the film forming step S2, a component of a target is deposited onto the substrate by using a sputtering apparatus. Subsequently, an intermediate layer forming step S3 is executed. The light transmitting layer 7 as an intermediate layer is formed by adhering a sheet or by a spin coating method.

Subsequently, an L1 pattern transfer step S4 is executed. In the L1 pattern transfer step S4, the pits or grooves of the L1 layer are transferred onto the UV hardening type sheet by using an L1 stamper manufactured by another step by, for example, a pressure transfer. In the case where the intermediate layer is formed by the spin coating method, the pits or grooves of the L1 layer are transferred to the UV hardening resin in a semi-hardening state.

In a UV hardening step S5 of the first time, UV (ultraviolet rays) are irradiated to the UV hardening type sheet or the UV hardening type resin by using a UV irradiating apparatus and a pattern of the transferred pits is fixed. In a disc peeling step S6, the disc is peeled off from the stamper by using a disc peeling apparatus. The "disc" mentioned here denotes the disc in which the pits or grooves of the L1 layer have been transferred to the light transmitting layer 7.

In a film forming step S7 of the L1 layer, the L1 layer, for example, the translucent reflecting film 8 is formed onto the formed pattern of L1. In the film forming step S7 of the L1 layer, a component of pure silver or silver alloy as a target is deposited onto the substrate by using the sputtering apparatus by a DC sputtering method in a manner similar to the foregoing L0 layer.

Subsequently, a cover layer forming step S8 is executed. The cover layer forming step S8 includes three steps of a UV hardening type adhesive agent coating step, a PC sheet adhering step, and a UV hardening step of the second time. In the UV hardening type adhesive agent coating step, the surface of the translucent reflecting film 8 is coated with a UV hardening type adhesive agent. The PC sheet is adhered to the disc. In the UV hardening step of the second time, the UV hardening type adhesive agent is adhered and the cover layer 3 is formed. In a forming step S9 of a hard coating layer, the hard coating layer is formed.

The presence or absence of defects of the disc with the double-layer structure formed by the manufacturing steps as mentioned above is inspected by using an inspecting apparatus, so that the disc is completed. A disc with the single-layer structure is also manufactured by the steps excluding the steps S3 to S7 regarding the L1 layer.

A technique which can solve the problem occurring in the case of using the organic resist in the related art and manufacture the high-density optical disc has been disclosed in Patent Document 1 (JP-A-2003-315988). There has been shown a technique that, according to an inorganic resist material made of incomplete oxide of a transition metal disclosed in Patent Document 1, a pattern smaller than the spot diameter can be exposed even by a visible laser of about 405 nm owing to heat recording characteristics. An attention is paid to such a technique as a technique which is useful for a mastering technique of the optical disc corresponding to the realization of the high recording density.

The incomplete oxide of the transition metal used here denotes a compound whose oxygen content is deviated in such a direction that it is smaller than a stoichiometric composition according to a valence number which the transition metal can have, that is, a compound in which an oxygen content in the incomplete oxide of the transition metal is smaller than that of the stoichiometric composition according to the valence number which the transition metal can have. In the incomplete oxide of the transition metal, since a latent image forming portion by the exposure has been oxidation-altered, it is soluble into an alkali developer and microfabrication of the master disc for the optical disc can be realized.

An embodiment of the invention relates to a positioning method of an objective lens in a cutting apparatus in the case of using such an inorganic resist. In the cutting apparatus, since a spiral track is formed by feeding precision of a master disc in which the inorganic resist has been formed as a film onto a substrate such as a silicon wafer or the like, tracking control is not made but only control in the focusing direction (focusing servo) is made. The focusing control is made by a method similar to the method such as an astigmatism method or the like which is used in a reproducing apparatus.

Since a lead-in range of the focusing control is limited, first, a distance between the objective lens and the surface of the master disc is brought in a range where the focusing servo can be pulled in. Control for such a purpose is called positioning control and is made by allowing the position of the master disc to approach the objective lens. The focusing servo is made operative after completion of the positioning. In the focusing servo, the vertical position of the objective lens is feedback-controlled so that an in-focus state can be obtained.

In the cutting apparatus disclosed in Patent Document 1, since the commercially available objective lens of the small diameter is used, generally, there is a tendency that a working distance of the objective lens decreases. The working distance is a physical vertex portion of the objective lens that is nearest to the focal position. For example, when the working distance is equal to 150 µm, if the positioning of the objective lens is not performed at high precision in the initial adjustment after the master disc was set, there is a fear that the objective lens collides with the master disc or an inconvenience occurs in the focusing servo. It is, therefore, important to set the objective lens at the time of the initial adjustment so that the focal position of the objective lens coincides with the recording surface of the master disc.

The positioning method in the related art will now be described. A focal depth of the objective lens can be calculated by a value $\lambda/(2NA)^2$ obtained by dividing a wavelength $\lambda$ of light by the square of the numerical aperture NA of the lens. In the cutting apparatus in the related art, in order to converge the spot of the laser beam for exposure, the wavelength is shortened and the numerical aperture is increased. Therefore, the focal depth becomes very small.

According to the method disclosed in Patent Document 1, the lens of the large numerical aperture and the light source of the short wavelength are not necessary in the related art. For example, when $\lambda=400$ nm and NA=0.85, the focal depth of 0.14 µm can be obtained. The focal depth denotes a range where the focal point is satisfactory even if the objective lens moves on an optical axis. Generally, photodetecting sensitivity in a photodetector of an optical pickup is set so that up to a value which is several times as large as the focal depth can be detected. The range where the focal depth can be detected is called a detectable range. For example, the detectable range is assumed to be 2.5 µm.

In the case of making positioning control of the objective lens by moving either the objective lens or the master disc, only when the distance between them lies within the foregoing detectable range, the detection output can be derived from the photodetector. When the distance is out of the detectable range, since the light reception amount decreases, the detection output is not obtained and it is difficult to sense the existence of the master disc. Therefore, when the detection output is obtained in the detectable range, by stopping the relative movement of the objective lens or the master disc, the focal distance of the objective lens almost coincides with the position of the surface of the master disc. After that, the focusing servo is made operative and the exposing operation is executed.

However, if the operation to stop the movement by using the detection output in the detectable range fails, the objective lens and the master disc collide. As a countermeasure for such a trouble, it is necessary that a safety stopping apparatus for stopping the movement at a distance where both of the objective lens and the master disc do not collide is provided so that the objective lens and the master disc do not collide. In the cutting apparatus in the related art, the following methods have been used.

As a first method, as shown in FIG. 3, there is a method of positioning the objective lens on the basis of an output signal of a distance sensor such as an optical distance sensor 23 which is moved integratedly with an objective lens 22. It is a method whereby the distance sensor 23 detects a distance from a master disc 21 and, when the detected distance reaches a set value, the movement is stopped.

The second method is a method of stopping the movement at a predetermined position by using a distance detecting function of a Z-axial stage for supporting the master disc 21.

SUMMARY OF THE INVENTION

According to the method shown in FIG. 3, it is necessary to make the focal position of the objective lens 22 coincide with the setting position of the distance sensor 23. If a relative distance (positional deviation) between the objective lens 22 and the distance sensor 23 changes by an amount of the working distance or more, there is a risk that the objective lens 22 collides with the master disc 21 at the time of the positioning operation and there is a fear that a defect occurs in the focusing servo. To avoid such a situation, if the optical pickup and the distance sensor 23 are exchanged, an initial adjustment of the focal position of the objective lens 22 and the distance sensor is necessary. Further, there is such a problem that the costs rise due to the addition of the distance sensor 23.

According to the method of using the distance detecting function of the Z-axial stage, if the position of the objective lens is not set to the position in which the master disc 21 does not coincide with the objective lens 22 and which corresponds to the working distance of the objective lens, an inconvenience occurs in the lead-in operation of the focusing servo. If the thickness of master disc 21 changed or if the optical pickup and the distance sensor 23 were exchanged, it is necessary to make the setting of the stop position of the Z-axial stage again.

It is, therefore, desirable to provide a lens position control method, a lens position control apparatus, a cutting method, and a cutting apparatus in which a stop position can be preferably controlled by using a laser beam for exposure without additionally using a distance sensor, and when a thickness of master disc changes or when an optical pickup is exchanged, it is unnecessary to change initial settings.

According to an embodiment of the present invention, there is provided a lens position control method comprising:

a moving step of moving either an objective lens or a master disc in which a resist material has been formed as a film onto a substrate, thereby changing a distance between the objective lens and a surface of the master disc;

a detecting step of detecting a return laser beam which has been transmitted through the objective lens and reflected by the surface of the master disc by a photodetector;

a step of stopping the movement of either the objective lens or the master disc when the master disc is located near a focal point of the objective lens and the return laser beam is detected by the photodetector;

a step of rewriting limit data to data corresponding to a position obtained by adding a movement permission amount smaller than a working distance of the objective lens to a stop position; and a step of stopping the movement which changes the distance between the objective lens and the surface of the master disc at the position corresponding to the limit data when the return laser beam is not detected.

According to another embodiment of the present invention, there is provided a cutting method of cutting a master disc by a laser beam, comprising:

a moving step of moving either an objective lens or the master disc in which a resist material has been formed as a film onto a substrate, thereby changing a distance between the objective lens and a surface of the master disc;

a detecting step of detecting a return laser beam which has been transmitted through the objective lens and reflected by the surface of the master disc by a photodetector;

a step of stopping the movement of either the objective lens or the master disc when the master disc is located near a focal point of the objective lens and the return laser beam is detected by the photodetector;

a step of rewriting limit data to data corresponding to a position obtained by adding a movement permission amount smaller than a working distance of the objective lens to a stop position;

a step of forming a latent image onto the master disc by the laser beam transmitted through the objective lens in correspondence to shapes of grooves or pits while controlling a focus of the objective lens; and a step of stopping the movement which changes the distance between the objective lens and the surface of the master disc at the position corresponding to the limit data when the return laser beam is not detected.

According to still another embodiment of the present invention, there is provided a lens position control apparatus comprising:

a driver moving either an objective lens or a master disc in which a resist material has been formed as a film onto a substrate, thereby changing a distance between the objective lens and a surface of the master disc;

a photodetector detecting a return laser beam which has been transmitted through the objective lens and reflected by the surface of the master disc; and a control unit to which a detection signal of the photodetector and a detection signal corresponding to the distance between the objective lens and the surface of the master disc are supplied and which outputs a drive signal to drive the driver, wherein the control unit stops the movement of either the objective lens or the master disc when the master disc is located near a focal point of the objective lens and the return laser beam is detected by the photodetector, rewrites limit data to data corresponding to a position obtained by adding a movement permission amount smaller than a working distance of the objective lens to a stop position, and stops the movement which changes the distance between the objective lens and the surface of the master disc at the position corresponding to the limit data when the return laser beam is not detected.

According to further another embodiment of the present invention, there is provided a cutting apparatus for cutting a master disc by a laser beam, comprising:

a driver moving either an objective lens or the master disc in which a resist material has been formed as a film onto a substrate, thereby changing a distance between the objective lens and a surface of the master disc;

a photodetector detecting a return laser beam which has been transmitted through the objective lens and reflected by the surface of the master disc;

a control unit to which a detection signal of the photodetector and a detection signal corresponding to the distance between the objective lens and the surface of the master disc are supplied and which outputs a drive signal to drive the driver; and a unit forming a latent image onto the master disc by the laser beam transmitted through the objective lens in correspondence to shapes of grooves or pits while controlling a focus of the objective lens, wherein the control unit stops the movement of either the objective lens or the master disc when the master disc is located near a focal point of the objective lens and the return laser beam is detected by the photodetector, rewrites limit data to data corresponding to a position obtained by adding a movement permission amount smaller than a working distance of the objective lens to a stop position, and stops the movement which changes the distance between the objective lens and the surface of the master disc at the position corresponding to the limit data when the return laser beam is not detected.

According to an embodiment of the present invention, the position of the objective lens can be controlled to the position where it does not collide with the master disc without using an external sensor. Therefore, it is possible to prevent the construction of the optical pickup from becoming complicated and the increase in the costs due to the addition of the distance sensor can be prevented. Since the setting value of the safety stopping apparatus is changed on the basis of the information of the focal position of the objective lens, if the thickness of master disc changed or if the optical pickup was exchanged, it is unnecessary to make the initial adjustment again.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A and 1B are schematic diagrams showing examples of an optical disc to which an embodiment of the invention can be applied;

FIG. 9 is a flowchart for explaining the positioning operation of the embodiment of the invention.

DETAILED DESCRIPTION OF THE PREFERRED EMBODIMENT

Figure 2:
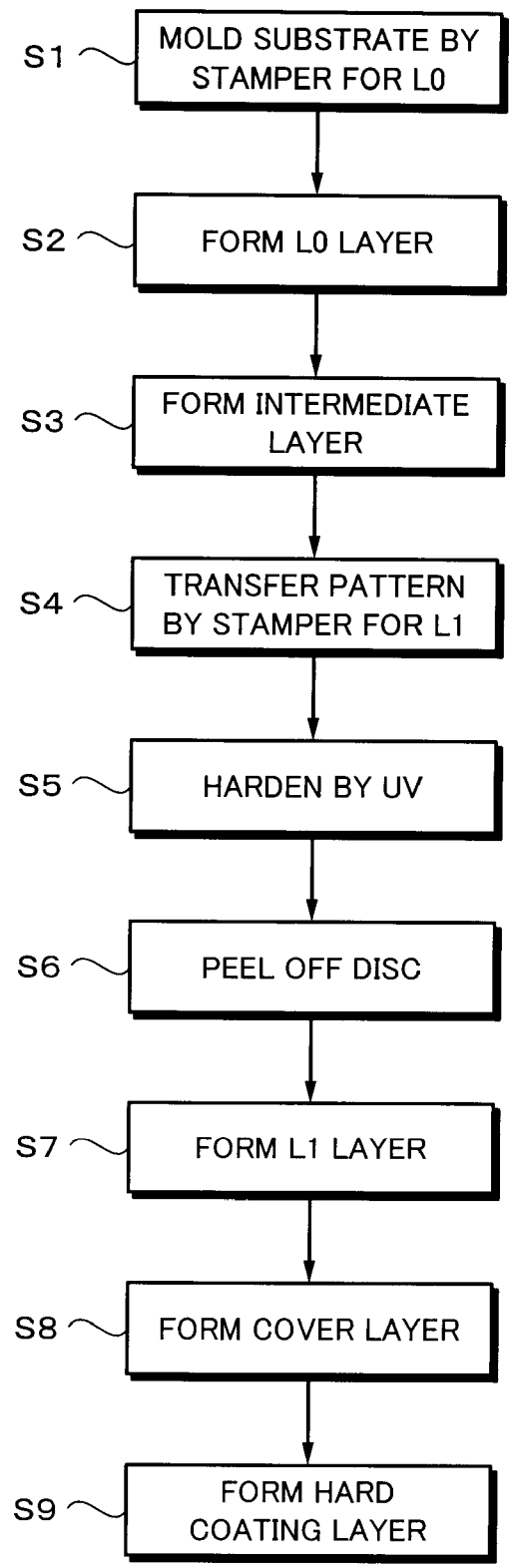
FIG. 2 is a flowchart showing an example of manufacturing steps of the optical disc to which the embodiment of the invention can be applied.
Figure 3:
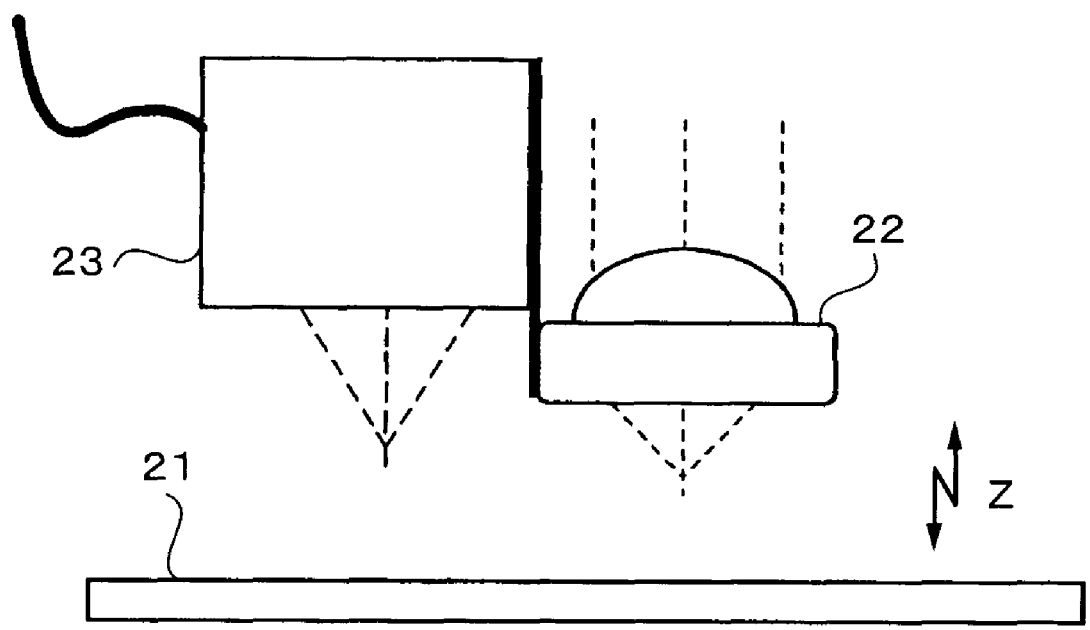
FIG. 3 is a schematic diagram for explaining an example of a position control method in the related art.
Figure 4:
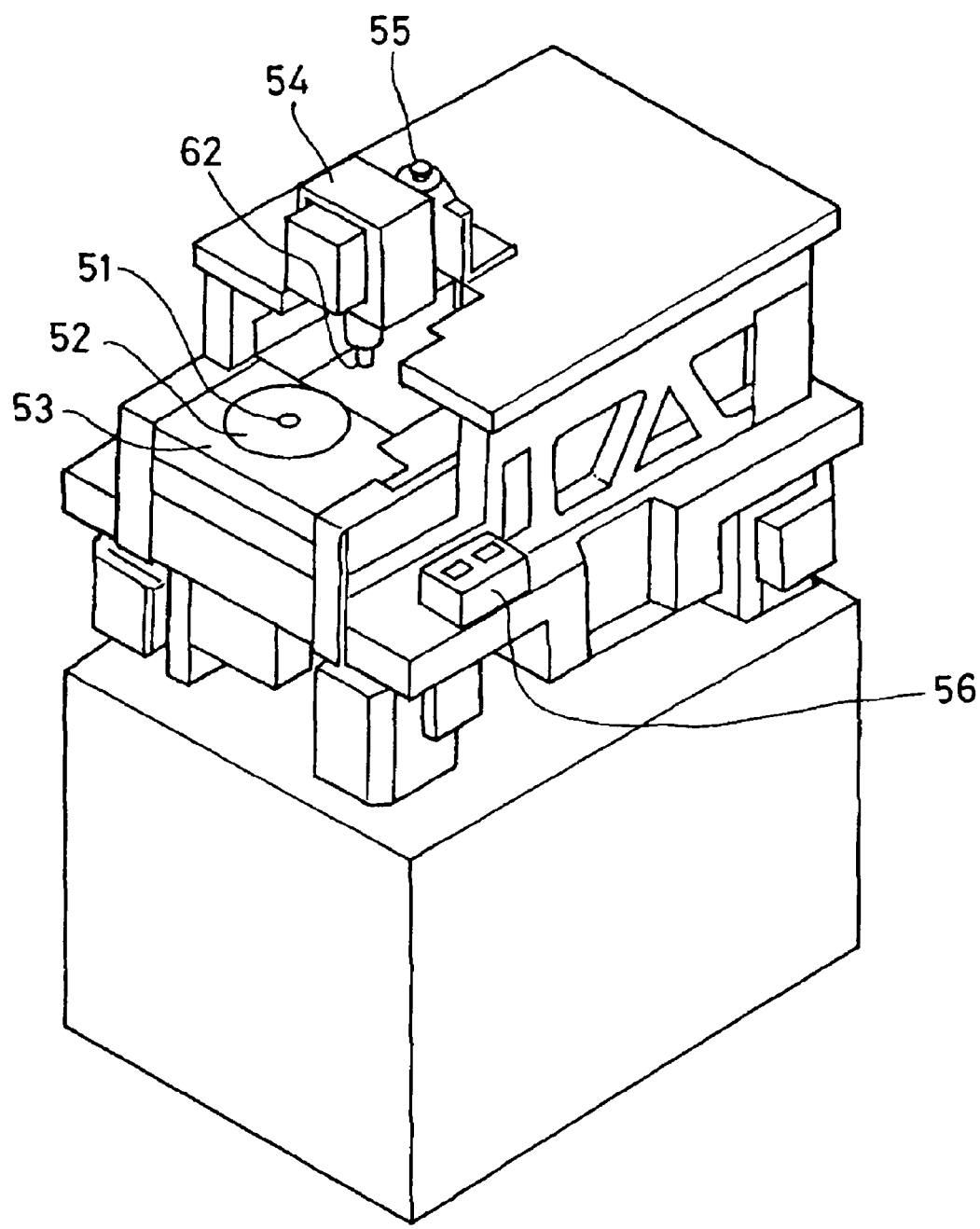
FIG. 4 is a perspective view schematically showing an external view of a cutting apparatus according to the embodiment of the invention.

An embodiment of the invention will be described hereinbelow with reference to the drawings. FIG. 4 schematically shows an external view of a cutting apparatus according to the embodiment of the invention. The cutting apparatus is arranged on a box-shaped cabinet. A master disc in which an inorganic resist has been formed as a film onto a substrate, for example, a silicon wafer is put on a disc-shaped cutting table 52 which is rotated by a spindle 51. The inorganic resist is an incomplete oxide of a transition metal. Molybdenum (Mo), tungsten (W), or the like is used as a transition metal. For example, the incomplete oxide of (0<x<0.75) at a composition ratio $Mo_{1-x}O_x$ is used. The cutting table 52 is rotated by a motor using the spindle 51 as a rotary axis.

The spindle 51, cutting table 52, and spindle motor are arranged on a supporting base 53. The supporting base 53 can be horizontally moved in the radial direction of the master disc. A spiral track is formed by the feeding precision of the master disc by the cutting table 52. Reference numeral 56 denotes a switching unit for operating the cutting apparatus.

An optical pickup block 54 is arranged over the cutting table 52. An objective lens 62 is arranged under the optical pickup block 54. A laser beam for exposing converged by the objective lens 62 is irradiated onto the master disc. The optical pickup block 54 can be deviated in the Z-axial direction as a direction perpendicular to the surface of the master disc by a Z-axial motor 55. A stepping motor, a linear motor, or the like can be used as a Z-axial motor 55.

Figure 5:
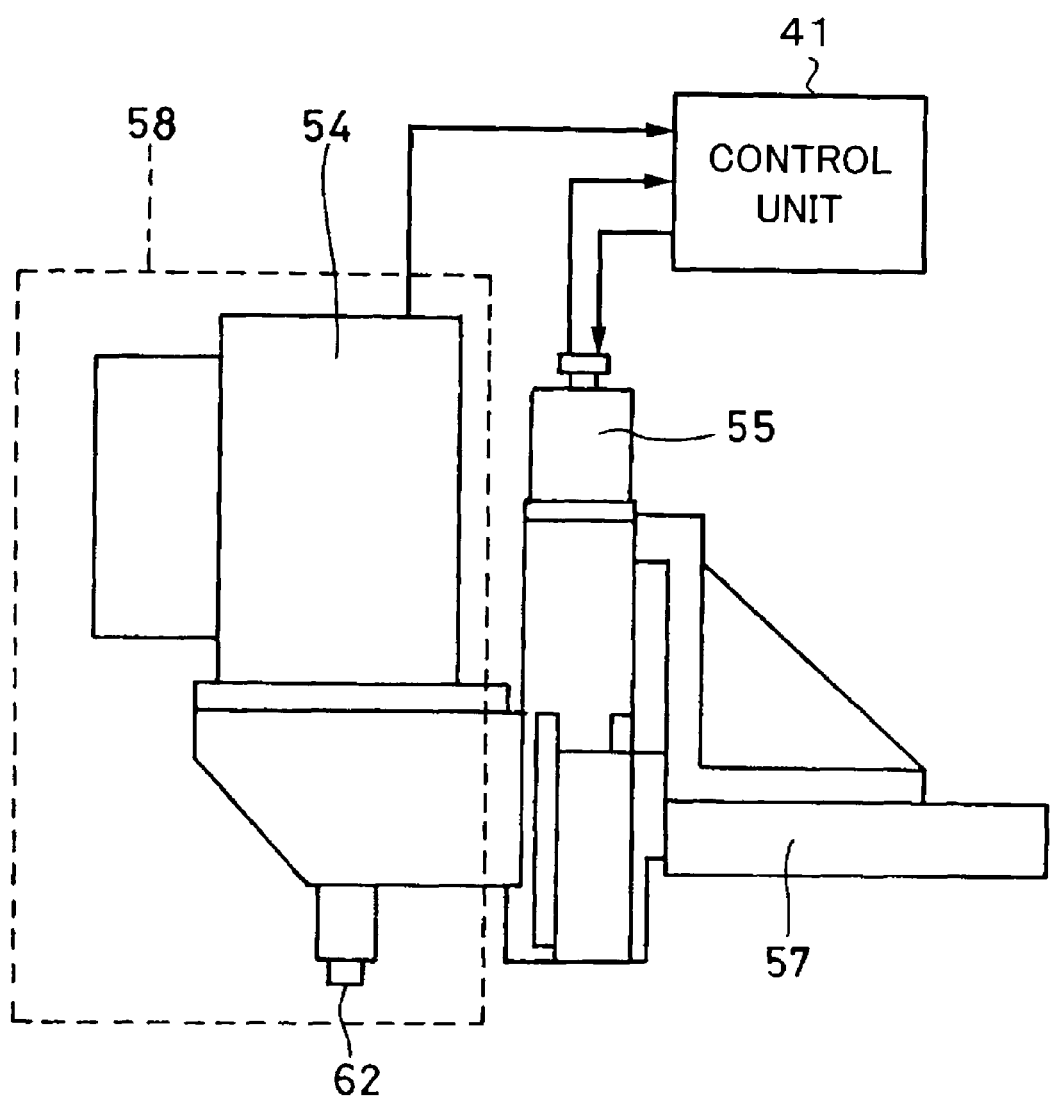
FIG. 5 is a schematic diagram showing an example of a moving mechanism of an optical pickup block in the embodiment of the invention.

FIG. 5 shows only the portion of the optical pickup block 54. The Z-axial motor 55 is fixed to a supporting unit 57. A portion which includes the optical pickup block 54 and is shown by a region surrounded by a broken line is elevated up and down by the Z-axial motor 55. In this manner, in the embodiment, the cutting table 52 can be moved in the horizontal direction and the optical pickup block 54 can be elevated up and down.

The apparatus has a control unit 41 to which a detection signal of a photodetector, which will be explained hereinafter, of the optical pickup block 54 and a detection signal of a distance sensor in the Z-axial direction equipped for the Z-axial motor 55 are inputted and which outputs a drive signal for the Z-axial motor 55. The control unit 41 includes a microcomputer and has a memory for holding limit data. A position sensor of a Z-axial stage may be used as a distance sensor in the Z-axial direction. As will be explained hereinafter, a drive signal to vibrate the objective lens in the Z-axial direction by a micro amplitude may be supplied to the optical pickup block 54 from the control unit 41.

Figure 6:
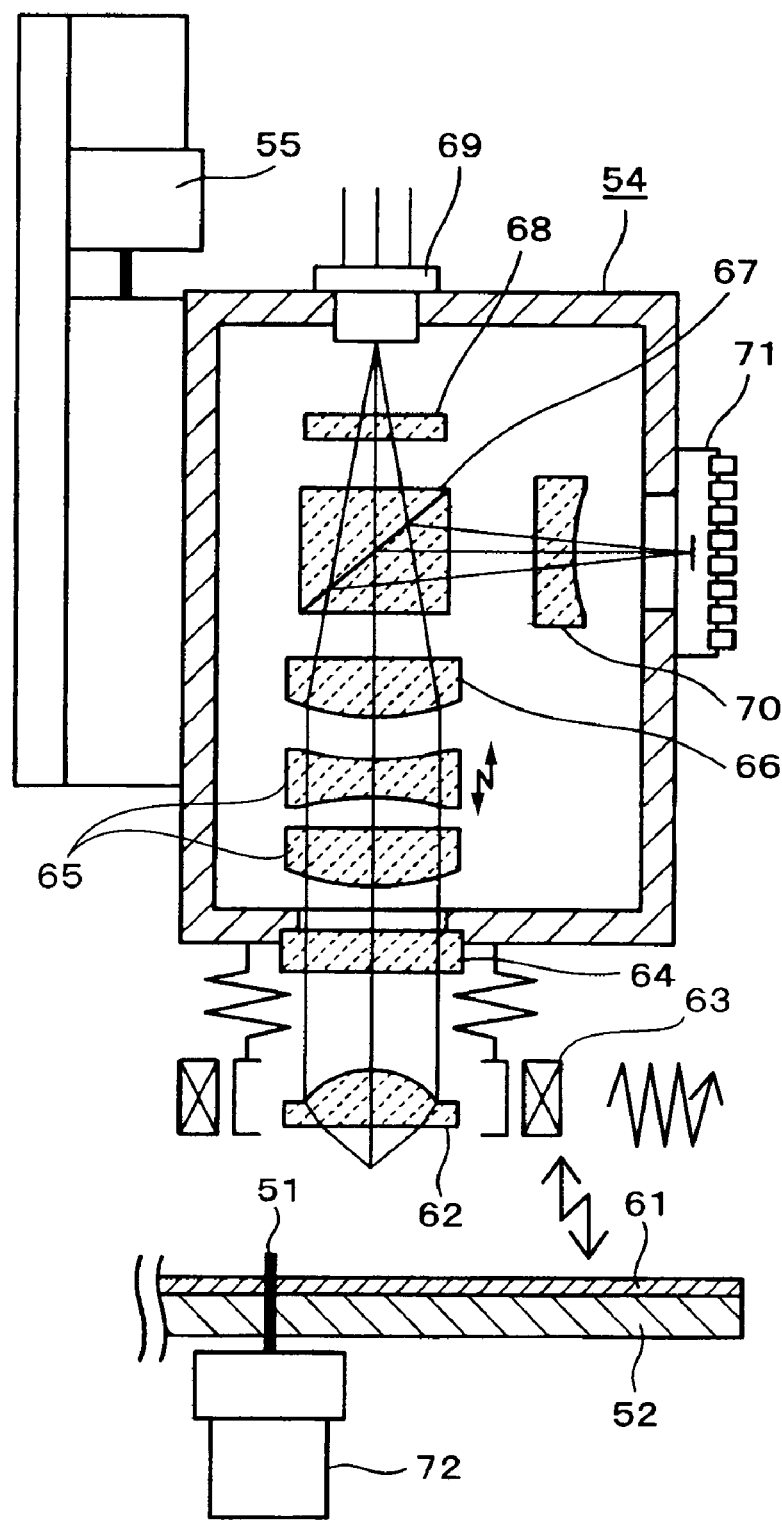
FIG. 6 is a schematic diagram showing an example of the optical pickup block.

FIG. 6 shows an example of the optical pickup block 54 to which the invention can be applied. The laser beam converged by the objective lens 62 having a construction of, for example, two groups is irradiated onto an inorganic resist on the surface of a master disc 61 put on the cutting table 52. The objective lens 62 is assembled in a uniaxial actuator 63 which can be deviated in the focusing direction (direction parallel with the optical axis).

The laser beam emitted from a laser diode 69 is inputted into a collimator lens 66 through a grating 68 and a polarization beam splitter (PBS) 67. ±primary diffracted light is generated through the grating 68. The laser beam converted into parallel light by the collimator lens 66 is inputted to a spherical aberration correcting device 65 such as a beam expander or the like.

Further, the laser beam is inputted to the master disc 61 through a quarter-wave plate 64 and the objective lens 62 and the master disc 61 is exposed. The laser beam of the linear polarization becomes the circularly polarized light by the quarter-wave plate 64.

The light reflected by the master disc 61 is transmitted through the objective lens 62 and returned from the circularly polarized light to the linearly polarized light by the quarter-wave plate 64. At this time, since the polarizing direction is inclined by 90° from the light (going light) of the light emitted from the laser diode 69, the light reflection occurs at the adhering surface of the polarization beam splitter 67.

After the return light which is being converged by the collimator lens 66 is transmitted through a multi-lens 70 before it is reflected by the PBS 67, it is converged onto a photodetector 71 formed as an IC and converted into an electric signal. The multi-lens 70 causes aberration to be used for an astigmatism method of detecting a focusing error by using a difference of the position where a light spot is formed.

The photodetector 71 is, for example, a 4-split detector. In the in-focus state, a shape of the light spot which is formed onto a photosensitive surface of the photodetector 71 by the return light is almost a true circle. When the objective lens 62 is too close to the master disc 61 and when it is too far from the master disc 61, each spot shape becomes an ellipse in which a major-axial direction and a minor-axial direction are mutually replaced. By obtaining a difference between the spot shapes from an output signal of the photodetector 71, the focusing error can be detected. The uniaxial actuator 63 is driven on the basis of the focusing error and the focusing error is corrected.

Further, although an intensity of the laser beam is set to a predetermined value upon positioning, at the time of the exposure to record data, in order to form a latent image corresponding to a pattern of the pits, grooves, or the like onto the master disc, the data is modulated by a direct modulating method of directly driving the laser diode 69 or an external modulating method using an AOM (Acousto Optical Modulator) or the like.

The foregoing optical pickup block 54 can be deviated in the Z-axial direction by the Z-axial motor 55. Upon detection of the focusing position, the optical pickup block 54 is moved so as to approach the master disc 61 in the optical axial direction by rotating the Z-axial motor 55. During the movement of the optical pickup block 54, the focal position is detected by using the output signal of the photodetector 71. In this case, as will be explained hereinlater, by vibrating the objective lens 62 by a micro amplitude, a detecting probability of the focusing position is raised.

When the focal position of the objective lens 62 almost coincides with the master disc 61, the reflection light from the master disc 61 is inputted to the photodetector 71 and the electric output signal is derived from the photodetector 71. The output signal of the photodetector 71 is supplied to the control unit, thereby stopping the driving to the Z-axial motor 55.

By the foregoing positioning method, positioning conditions which are necessary when using the focusing servo that is ordinarily used for the optical disc are satisfied, and the optical recording can be executed by making the focusing servo operative.

According to the embodiment of the invention, the objective lens 62 is vibrated in the Z direction at a high speed by the micro amplitude. The amplitude of the vibration in this instance is set to a very small value enough to sufficiently guarantee that the master disc 61 does not collide with the objective lens 62 and to cause an effect of raising a possibility of detection of the existence of the master disc 61.

Theoretically, it is sufficient to move at least either the master disc 61 or the objective lens 62 in order to change a distance between the master disc 61 and the objective lens 62. In the embodiment, the whole optical pickup block 54 is moved by the Z-axial motor 55 in the state where the position of the master disc 61 is come to rest as mentioned above. Further, the objective lens 62 is vibrated by the micro amplitude by driving the uniaxial actuator 63. It is also possible to construct in such a manner that the objective lens 62 is made to gradually approach the master disc 61 merely by driving the uniaxial actuator 63 and the objective lens 62 is vibrated without providing the Z-axial motor 55. Further, it is also possible to construct in such a manner that the objective lens 62 is merely vibrated and is deviated so that the position of the master disc 61 approaches the objective lens 62.

The operation will be described hereinbelow with respect to a system for moving the master disc side as an example in order to make an explanation easy. Upon positioning, the master disc 61 in which the inorganic resist has been formed as a film onto the substrate is elevated up and approaches the objective lens 62.

Figure 7:
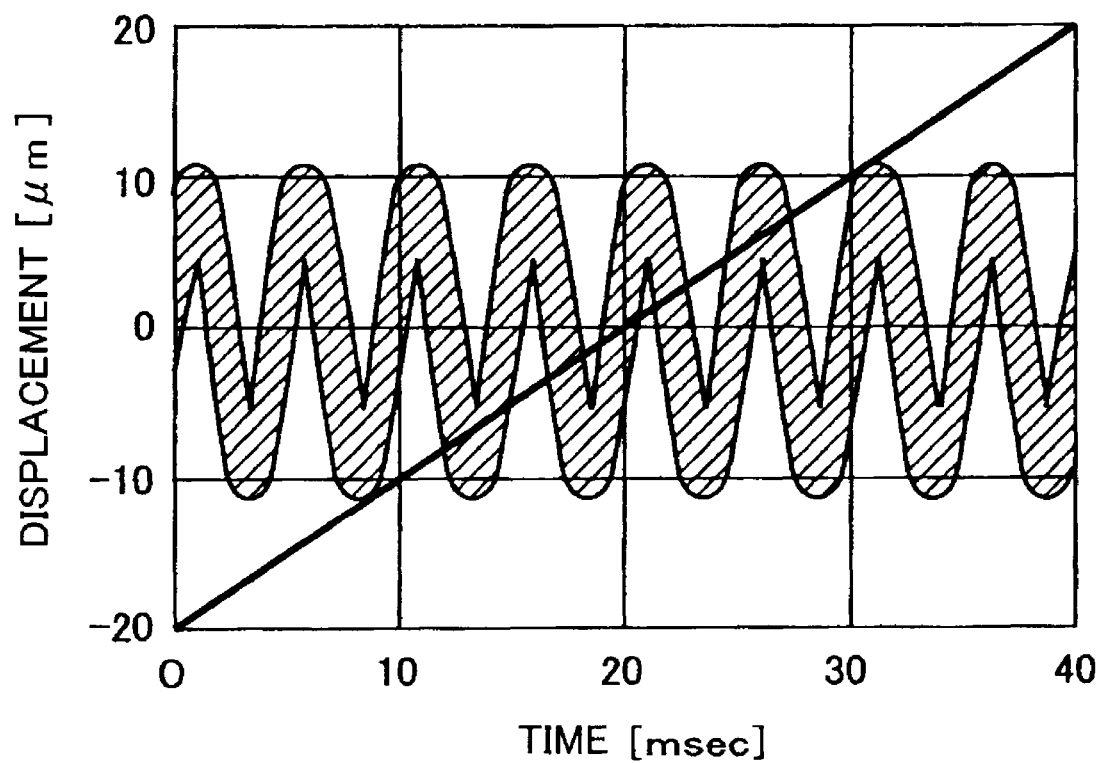
FIG. 7 is a graph for explaining an example of the operation for obtaining a detection signal when a master disc is moved in the embodiment of the invention.

For example, when the objective lens 62 is vibrated in accordance with a sine wave in which an amplitude is equal to 10 μm and a frequency is equal to 200 Hz, such a sine wave can be expressed as a waveform shown in FIG. 7. Assuming that the master disc 61 is moved at a speed of 1 mm/sec, the movement of that the master disc 61 can be expressed as a linear straight line in the graph of FIG. 7. The displacement of the objective lens 62 can be expressed so as to change like a sine wave with the detectable range, for example, a width of 2.5 μm existing in the upper (+) and lower (−) positions around the in-focus position (displacement: 0) as a center.

As shown in FIG. 7, the linear straight line and the sine-wave-shaped displacement cross at a plurality of positions. By monitoring a sum signal of the photodetector 71, the sum signal is generated for the period of time during which they cross. According to the embodiment of the invention, the objective lens 62 is vibrated. The distance between the surface of the resist of the master disc 61 and the objective lens 62 is decreased or increased in association with the vibration of the objective lens 62. Therefore, even if such a distance in the case where the objective lens 62 is not vibrated is out of the detectable range, for example, 2.5 μm, it enters the detectable range as a result of the vibration. For example, even when the surface of the master disc 61 and the objective lens 62 are located at an upper position over the in-focus position by 10 μm, the sum signal is outputted from the photodetector at a position near the peak on the negative side of the objective lens 62. On the contrary, even when the objective lens 62 passes through the in-focus position and the objective lens 62 is located at a lower position under the in-focus position by 10 μm, the sum signal is outputted from the photodetector at a position near the peak on the positive side of the objective lens 62.

As mentioned above, according to the embodiment, when the master disc 61 is made to gradually approach the objective lens 62, the state where the detection signal can be generated from the photodetector occurs a plurality of number of times and a possibility of detection of the positioning can be raised more than that in the method whereby the objective lens 62 is not vibrated. The operation in the embodiment of the invention is equivalent to the operation for allowing the objective lens 62 to be come to rest and allowing the master disc 61 to approach the objective lens 62 while vibrating the master disc 61 by a micro amplitude. However, it is actually difficult to make control so as to vibrate the master disc 61. As mentioned above, the Z-axial motor 55 is used, the actuator 63 in the focusing direction inherently provided for the optical pickup block 54 can be used, and the objective lens 62 can be easily vibrated in the Z direction.

When the sum signal of the photodetector is detected, the driving of the driving source for moving the master disc 61 in the Z direction is stopped and a positioning sequence is finished. After that, the focusing servo is turned on. The sum signal which is outputted from the photodetector is subjected to an amplifying process and an integrating process or a sampling-holding process is executed as necessary. Further, the level of the detection signal is compared with a threshold value. There is provided a safety stopping mechanism for preventing the objective lens 62 from colliding with the master disc 61 when the operator fails in positioning.

Figure 8:
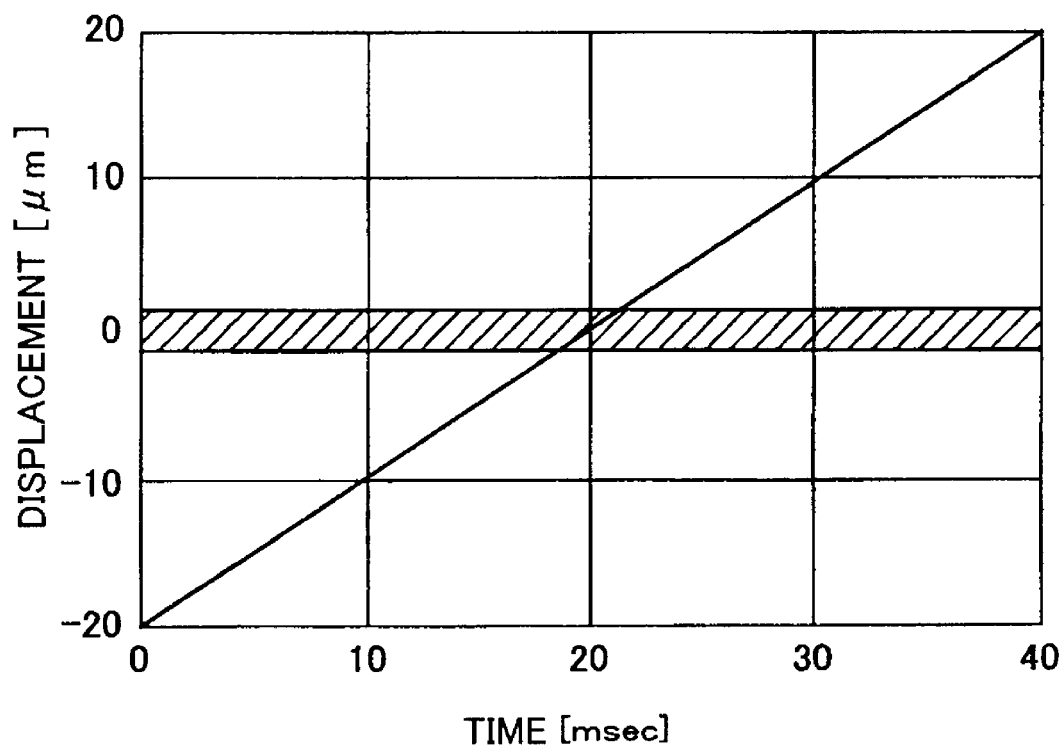
FIG. 8 is a graph for explaining another example of the operation for obtaining the detection signal when the master disc is moved in the embodiment of the invention.

Although the objective lens 62 has been vibrated by the micro amplitude and it is detected that it has entered the detectable range in the above description, it is not necessary to vibrate the objective lens 62 by the micro amplitude. For example, in the optical pickup block 54 shown in FIG. 6, a sine wave is not supplied to the uniaxial actuator 63. As a result, the objective lens 62 is not vibrated in the Z direction by the uniaxial actuator 63. FIG. 8 is a graph showing a displacement (axis of ordinate) to a time (axis of abscissa) in the case where either the objective lens or the master disc, for example, the master disc is made to approach the objective lens from a remote position at a speed of 1 mm/sec in the Z-axial direction without vibrating the objective lens 62. Although the objective lens side has been moved in the actual apparatus, the operation will be explained here as an example with respect to the system in which the master disc side is moved in order to make the explanation easy. The displacement at the focal point is set to 0. The displacement which occurs at a ratio of 1 μm per 1 msec is shown by a linear straight line.

As mentioned above, as shown by a hatched band in FIG. 8, the detectable range is a predetermined range, for example, 2.5 μm where the position of the displacement of 0 is set to a center. Therefore, a detection signal can be obtained from the photodetector only in a period of time during which the linear straight line crosses the band.

FIG. 9 shows a flow of a positioning process which is executed by the control unit (refer to FIG. 5) in the embodiment of the invention. In step S11, a positioning sequence is started. In step S12, whether or not a focusing search has been successful is discriminated. As mentioned above, the focusing search is the operation to detect the state where the master disc 61 is located near the focusing position of the objective lens 62. When the distance between the master disc 61 and the objective lens 62 becomes almost a focusing distance and the detection signal is generated from the photodetector, it is determined that the focusing search has been successful.

In step S13, the Z-axial motor is stopped and the optical pickup stops. In step S14, the limit data for limitation stored in the memory is rewritten. The limit data is data corresponding to the safety stopping position. The position which is shorter than the position where the focusing search is successful by a movement permission amount, that is, the position where the distance between the master disc 61 and the objective lens 62 is shorter by 100 μm is specified as a safety stop position. The movement permission amount is set to be smaller than the working distance of the objective lens 62.

In the case of using a stepping motor for the Z-axial stage, the position where the focusing search is successful can be counted by an encoder. The limit position is set to the number of pulses or distance obtained by counting the movement amount of 100 μm to a count value. The limit data is updated by overwriting the count value.

When the limit data is updated, a position sensor or the like attached to the Z-axial stage may be used. In such a case, instead of the number of pulses, an analog voltage obtained by adding a voltage corresponding to 100 μm to an analog voltage which is outputted may be A/D converted and obtained digital data may be stored as limit data. The limit data is rewritten each time the focusing search is successful. When the limit data is updated in step S14, the positioning sequence is finished in step S17.

If the focusing search is not successful in step S12, the processing routine advances to step S15. In step S15, whether or not the position has reached the limit, that is, the safety stop position is discriminated. As mentioned above, the safety stop position is a position obtained by adding the movement permission amount to the position where the focusing search is successful. If it is determined that the position has reached the limit, the Z-axial motor is stopped in step S16. The collision of the master disc 61 and the objective lens 62 can be prevented by the stop of the Z-axial motor. The positioning sequence is finished (step S17). If the Z-axial motor is stopped in the unsuccessful state of the focusing search, the operator is notified of an error message showing that the focusing search is unsuccessful, and the sequence is finished.

According to the foregoing control method of the lens stop position, the position corresponding to the distance obtained by adding the movement permission amount to the position of the objective lens in the case where the focusing search is successful is set to the stop position. According to the setting of the stop position, since the position corresponding to the distance obtained by adding the movement permission amount to the focal position which was actually detected is set to the stop position, even if the optical pickup was exchanged and the distance sensor was exchanged or the thickness of master disc changed, in a range where the relation in which the movement permission amount is smaller than the working distance is satisfied, the collision of the objective lens and the master disc can be prevented and there is no need to make the initial adjustment again.

Although the embodiment of the invention has been specifically described above, the invention is not limited to the foregoing embodiment but various modifications based on the technical idea of the invention are possible. For example, the invention is not limited to the sine wave but the actuator may be driven by a saw-tooth wave, a pulse wave, or the like and the objective lens may be vibrated.

It should be understood by those skilled in the art that various modifications, combinations, sub-combinations and alterations may occur depending on design requirements and other factors insofar as they are within the scope of the appended claims or the equivalents thereof.

What is claimed is:

1. A lens position control method comprising:
   a moving step of moving an objective lens relative to a master disc in which a resist material has been formed as a film onto a substrate, thereby changing a distance between said objective lens and a surface of said master disc, said movement being controlled by limit data setting forth a relative travel limit between said objective lends and said master disc;
   a detecting step of detecting with a photodetector a return laser beam which has been transmitted through said objective lens and reflected back by said surface of said master disc;
   a step of stopping said relative movement between said objective lens and said master disc at a focal point position when said master disc is located at or near a focal point of said objective lens and said return laser beam is detected by said photodetector;
   a step of rewriting limit data to data corresponding to a position obtained by adding a movement permission amount to the focal point position, the movement permission amount being smaller than a working distance of said objective lens, to establish a stop position; and
   a step of stopping said relative movement between said objective lens and said surface of said master disc at said stop position determined by said limit data when said return laser beam is not detected.

2. A method according to claim 1, wherein in said moving step, said objective lens is vibrated in a direction parallel with an optical axis.

3. A cutting method of cutting a master disc by a laser beam, comprising:
   a moving step of moving an objective lens relative to said master disc on which a resist material has been formed as a film onto a substrate, thereby changing a distance between said objective lens and a surface of said master disc, said movement being controlled by limit data setting forth a relative travel limit between said objective lens and said master disc;
   a detecting step of detecting with a photodectector a return laser beam which has been transmitted through said objective lens and reflected back by said surface of said master disc;
   a step of stopping said relative movement between said objective lens and said master disc at a focal point position when said master disc is located at or near a focal point of said objective lens and said return laser beam is detected by said photodetector;
   a step of rewriting said limit data with data corresponding to a position obtained by adding a movement permission amount to the focal point position, the movement permission amount being smaller than a working distance of said objective lens, to establish a stop position;

a step of forming a latent image onto said master disc by said laser beam transmitted through said objective lens, which latent image corresponds to shapes of grooves or pits, while controlling a focus of said objective lens; and a step of stopping the movement which changes the distance between the objective lens and the surface of the master disc at said stop position corresponding to said limit data when said return laser beam is not detected.

4. A method according to claim 3, wherein in said moving step, said objective lens is vibrated in a direction parallel with an optical axis.

5. A method according to claim 3, wherein said resist material is an inorganic resist.

6. A method according to claim 3, wherein a wavelength of said laser beam is equal to about 400 nm and a numerical aperture of said objective lens is equal to or lager than about 0.85.

7. A lens position control apparatus comprising:

a driver configured to move an objective lens relative to a master disc in which a resist material has been formed as a film onto a substrate, thereby changing a distance between said objective lens and a surface of said master disc;

a photodetector configured and positioned to detect a return laser beam which has been transmitted through said objective lens and reflected by said surface of said master disc; and a control unit in communication with said photodetector and configured to output a drive signal to drive said driver, wherein said control unit stops said relative movement between said objective lens and said master disc at a focal point position when said return laser beam is detected by said photodetector and when said master disc is located at or near a focal point of said objective lens, rewrites said limit data with data corresponding to a position obtained by adding a movement permission amount to the focal point position, the movement permission amount being smaller than a working distance of said objective lens, to establish a stop position, and stops said relative movement when said return laser beam is not detected by said photodetector at said stop position dictated by said limit data.

8. An apparatus according to claim 7, wherein when said driver changes a distance between said objective lens and a surface of said master disc, said objective lens is vibrated in a direction parallel with an optical axis.

9. A cutting apparatus for cutting a master disc by a laser beam, comprising:

a driver moving an objective lens relative to said master disc in which a resist material has been formed as a film onto a substrate, thereby changing a distance between said objective lens and a surface of said master disc;

a photodetector detecting a return laser beam which has been transmitted through said objective lens and reflected back by said surface of said master disc;

a circuit for generating a detecting signal corresponding to said distance between said objective lens and said surface of said master disc;

a control unit to which a detection signal of said photodetector and said detection signal corresponding to said distance between said objective lens and said surface of said master disc are supplied and which outputs a drive signal to drive said driver; and a unit forming a latent image onto said master disc by said laser beam transmitted through said objective lens to form grooves or pits while controlling a focus of said objective lens, wherein said control unit stops said relative movement at a focal point position when said master disc is located at or near a focal point of said objective lens and said return laser beam is detected by said photodetector, rewrites said limit data with data corresponding to a position obtained by adding a movement permission amount to the focal point position, the movement permission amount being smaller than a working distance of said objective lens, to establish a stop position, and stops said relative movement which changes said distance between said objective lens and said surface of said master disc at said stop position determined by said limit data when said return laser beam is not detected.

10. An apparatus according to claim 9, wherein when said driver changes a distance between said objective lens and a surface of said master disc, said objective lens is vibrated in a direction parallel with an optical axis.

11. An apparatus according to claim 9, wherein said resist material is an inorganic resist.

12. An apparatus according to claim 9, wherein a wavelength of said laser beam is equal to about 400 nm and a numerical aperture of said objective lens is equal to or lager than about 0.85.

* * * * *